(12) United States Patent
Schneider et al.

(10) Patent No.: US 9,890,805 B2
(45) Date of Patent: Feb. 13, 2018

(54) BLIND RIVET ARRANGEMENT

(71) Applicant: NEWFREY LLC, Newark, DE (US)

(72) Inventors: Stephan Schneider, Giessen (DE); Horst Baumann, Giessen (DE)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 14/614,882

(22) Filed: Feb. 5, 2015

(65) Prior Publication Data

US 2017/0130757 A1 May 11, 2017
US 2017/0268555 A9 Sep. 21, 2017

Related U.S. Application Data

(63) Continuation of application No. PCT/EP2013/065866, filed on Jul. 29, 2013.

(30) Foreign Application Priority Data

Aug. 16, 2012 (DE) .................. 10 2012 016 592

(51) Int. Cl.
*F16B 13/04* (2006.01)
*F16B 19/10* (2006.01)
*F16B 5/04* (2006.01)

(52) U.S. Cl.
CPC ............ *F16B 19/1054* (2013.01); *F16B 5/04* (2013.01)

(58) Field of Classification Search
CPC .............................. F16B 19/1054; F16B 5/04
USPC ... 411/38, 44, 501, 361, 183, 14.5, 176, 181
See application file for complete search history.

(56) References Cited

U.S. PATENT DOCUMENTS

| | | | | | |
|---|---|---|---|---|---|
| 2,040,939 | A | * | 5/1936 | Huck | B21K 1/60 411/501 |
| 2,562,336 | A | * | 7/1951 | Selden | F16B 5/04 29/445 |
| 2,767,877 | A | * | 10/1956 | Newsom | F16B 5/04 29/526.2 |
| 3,443,473 | A | * | 5/1969 | Tritt | F16B 19/10 29/523 |

(Continued)

FOREIGN PATENT DOCUMENTS

| | | |
|---|---|---|
| CN | 1046374 | 10/1990 |
| CN | 2099212 | 3/1992 |

(Continued)

*Primary Examiner* — Gary Estremsky
(74) *Attorney, Agent, or Firm* — Kofi A. Schulterbrandt; Michael P. Leary

(57) ABSTRACT

Blind rivet sleeve for a blind rivet, having a sleeve head which has a bearing face for bearing against a visible workpiece surface, and having a sleeve shank, wherein the blind rivet sleeve has a through-opening through which a mandrel can be guided, wherein the sleeve shank has a head forming portion which, during the setting of the blind rivet, is designed to form a blind head, and has a folding portion which is arranged between the head forming portion and the sleeve head and which, during the setting of the blind rivet, is designed to form a sleeve fold for the purpose of achieving a clamping thickness compensation.
In this arrangement, the sleeve head has in the region of the bearing face an axial recess for receiving at least part of the sleeve fold formed during the setting.

14 Claims, 2 Drawing Sheets

(56) References Cited

U.S. PATENT DOCUMENTS

| | | | | |
|---|---|---|---|---|
| 4,170,919 A | * | 10/1979 | Siebol | F16B 19/008 |
| | | | | 411/43 |
| 5,664,919 A | * | 9/1997 | Smith | B21J 15/04 |
| | | | | 411/34 |
| 6,389,676 B1 | * | 5/2002 | Denham | F16B 19/1054 |
| | | | | 227/51 |
| 7,303,366 B2 | * | 12/2007 | Smith | F16B 19/1072 |
| | | | | 411/34 |
| 8,402,632 B2 | * | 3/2013 | Gory | B21J 15/043 |
| | | | | 29/243.521 |
| 2005/0019131 A1 | * | 1/2005 | Stevenson | F16B 11/006 |
| | | | | 411/82 |
| 2005/0095078 A1 | * | 5/2005 | Makino | F16B 37/067 |
| | | | | 411/183 |

FOREIGN PATENT DOCUMENTS

| | | |
|---|---|---|
| CN | 1112654 | 11/1995 |
| EP | 0691479 | 1/1996 |
| EP | 1498617 | 1/2005 |
| GB | 2457105 | 8/2009 |
| JP | 61249639 | 11/1986 |

* cited by examiner

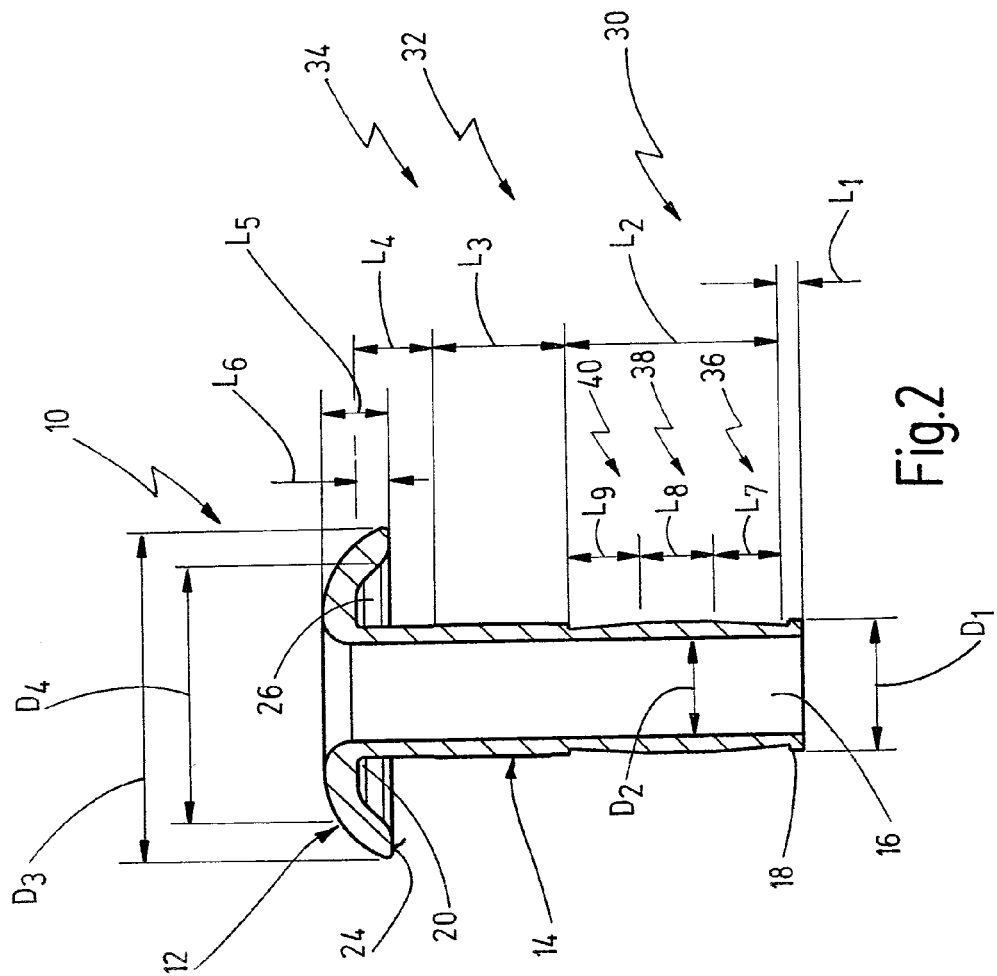
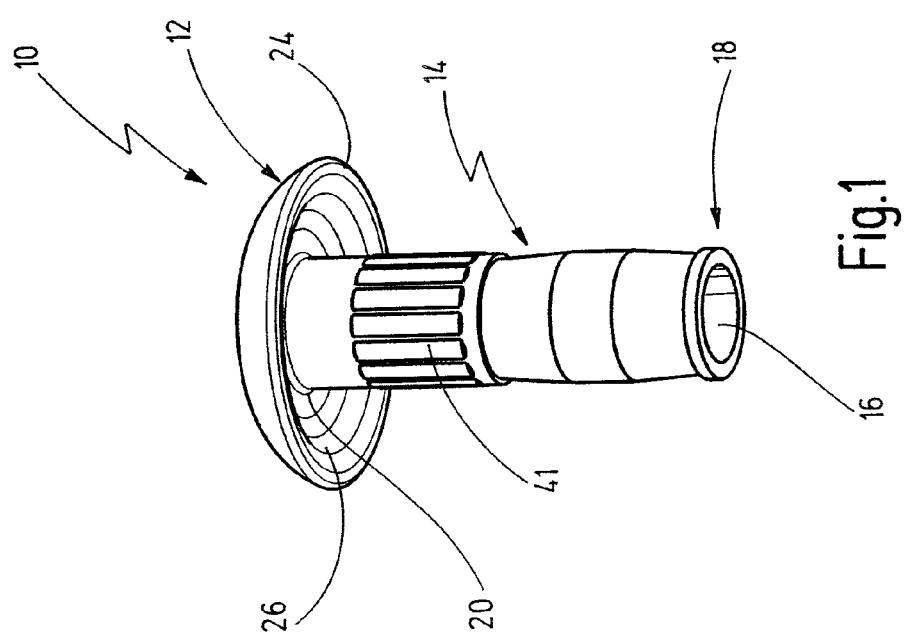
Fig.1
Fig.2

BLIND RIVET ARRANGEMENT

FIELD OF THE INVENTION

The present invention relates to a blind rivet sleeve for a blind rivet, having a sleeve head which has a bearing face for bearing against a visible workpiece surface, and having a sleeve shank, wherein the blind rivet sleeve has a through-opening through which a mandrel can be guided, wherein the sleeve shank has a head forming portion which, during the setting of the blind rivet, is designed to form a blind head, and has a folding portion which is arranged between the head forming portion and the sleeve head and which, during the setting of the blind rivet, is designed to form a sleeve fold for the purpose of achieving a clamping thickness compensation.

BACKGROUND OF THE INVENTION

Furthermore, the present invention relates to a blind rivet having a mandrel and a blind rivet sleeve of this type, wherein the mandrel has a blind-side mandrel head for bearing in the region of a blind-side end of the sleeve shank, and also to a blind rivet connection of at least two workpieces using such a blind rivet.

Blind rivets are used for connecting workpieces where access is possible only from one side (the visible side). Here, the blind rivet is introduced with the blind-side mandrel head through pre-formed bores in the workpieces to be connected. This is followed by the setting or joining process in which the mandrel is pulled off on the visible side in the direction away from the workpiece arrangement (for example by means of blind-riveting tongs). This leads to a deformation of the head forming portion on the blind side and the formation of a blind head which bears against the blind-side workpiece surface after the setting.

The provision of a folding portion between head forming portion and sleeve head makes it possible to use the same type of blind rivet sleeve for different clamping thicknesses of workpiece arrangements (so-called multiple-region rivet).

On the other hand, it is preferable when setting blind rivets in plastics, such as, for example, thermoplastics, thermosets, CRPs, etc., to minimize the mechanical loading on faces and edges of the workpiece arrangement in the axial and/or radial direction.

The document DE 10 2010 017296 A1 discloses a blind rivet for connecting components made of plastic, which has a sleeve shank which has a first portion adjoining the sleeve head and a second portion adjoining the first portion. The second portion is designed as a head forming portion. The first portion has a higher strength than the second portion such that the outside diameter of the first portion does not increase or increases only slightly during the setting of the blind rivet.

As a result, it is intended to be possible to insert the first portion of the blind rivet into a workpiece bore with little oversize without a considerable radial pressing occurring between the rivet portion and the bore wall during the setting, by means of which the workpiece could be damaged.

Blind rivets of this type are used, in particular, in the motor vehicle industry in order to fasten attachment parts, wherein one of the workpieces or both workpieces can be produced from plastic.

In the case of blind rivet sleeves which have a folding portion, the sleeve fold thus formed in some clamping thicknesses can lead to high hole face bearing pressures and also to an expansion of the bore in plastic workpieces or even to the bursting of components particularly when small edge spacings are intended to be produced.

In order, for example when joining workpieces, to be able to design straps on the workpieces to be smaller, these edge spacings should be configured to be as small as possible.

Against this background, it is an object of the invention to provide an improved blind rivet sleeve for a blind rivet, a blind rivet having a mandrel and such a blind rivet sleeve and also a blind rivet connection of at least two workpieces using such a blind rivet, and it should be possible by means of the blind rivet to connect even softer or mechanically less loadable workpieces such as plastics while nevertheless achieving a relatively large clamping region.

In the case of the blind rivet sleeve stated at the outset, this object is achieved in that the sleeve head has in the region of the bearing face an axial recess for receiving at least part of the sleeve fold formed during the setting.

Furthermore, this object is achieved by a blind rivet having a mandrel and such a blind rivet sleeve, wherein the mandrel has a blind-side mandrel head for bearing in the region of a blind-side end of the sleeve shank, and also by a blind rivet connection of at least two workpieces using such a blind rivet.

The formation of an axial recess in the region of the bearing face of the sleeve head means that the sleeve fold which forms at least at certain clamping thicknesses can move at least partially into the axial recess during the setting. This makes it possible to achieve a situation in which the workpiece arrangement is not damaged during the setting process. In particular, a radial expansion of the rivet sleeve can be maintained within narrow limits. As a result, the edge spacing between sleeve shank outside diameter and inside diameter of the bore in the workpieces can be minimized. As a result, in turn, the outside diameter of the sleeve head can be minimized since a large hole covering of too large rivet holes for the purpose of tolerance compensation in the radial direction is not required.

Accordingly, the blind rivet can also be used, for example, in structural engineering with glass-fibre-reinforced plastics (CRPs), where high shear and tensile strengths are achieved.

Furthermore, if appropriate, high head tensile strengths can be achieved.

The object is thus completely achieved.

BRIEF SUMMARY OF THE INVENTION

According to a particularly preferred embodiment, an axial depth of the axial recess and an axial length of the folding portion are selected such that the sleeve fold makes no contact or substantially force-free contact with a workpiece arrangement connected by means of the blind rivet during or after the setting of the blind rivet. By substantially force-free contact is meant that the contact remains within permissible loading limits.

The ratio of axial depth of the axial recess and of axial length of the folding portion is preferably in a range from 1 to 2, preferably in the range from 1.5 to 2.

According to a further preferred embodiment, an axial depth of the axial recess is greater than or equal to 0.3 times the axial length of the sleeve head, preferably greater than or equal to 0.4 times the axial length of the sleeve head.

As a result, it is possible to provide an axial recess having a sufficiently high volume to receive at least part of the sleeve fold.

According to a further preferred embodiment, an outside diameter of the axial recess is greater than or equal to 0.4 times the outside diameter of the sleeve head, preferably greater than or equal to 0.5 times the outside diameter of the sleeve head and in particular greater than or equal to 0.6 times and very particularly preferably greater than or equal to 0.7 times the outside diameter of the sleeve head.

This measure, too, contributes to a high volume of the axial recess.

The sleeve head can in this case be designed to be mushroom-like such that the bearing face of the sleeve head is an annular face which surrounds the axial recess.

The outside diameter of the sleeve fold is greatest for a minimum clamping thickness and is smaller for this case than the outside diameter of the axial recess. As a result, a sufficiently high spacing remains in the radial direction even with minimum clamping thicknesses, such that more than 70%, in particular more than 80%, preferably more than 90% and in particular 100% of the sleeve fold can be received in the axial recess.

By contrast, it is possible in the case of large clamping thicknesses for the folding portion to be deformed only slightly, if at all, during the setting of the blind rivet.

The strength of the folding portion is preferably selected such that, during the setting of the blind rivet, first of all the head forming portion is deformed into the blind rivet, and only then is the sleeve fold formed on the mandrel when increasing the pull-off force, thereby resulting in a tightening of the workpieces of the workpiece arrangement against one another in the axial direction.

According to a particularly preferred embodiment, a rigid portion is arranged in the axial direction between the folding portion and the head forming portion.

The rigid portion preferably has a resistance to radial buckling which is greater than that of the folding portion and is greater than that of the head forming portion.

The increased strength of the rigid portion can be achieved, in particular, by a cold forming operation, but also by local heat treatment, with, for example, longitudinal grooves being stamped into the rigid portion, or the like.

The axial length of the rigid portion is in this case preferably greater than or equal to the minimum clamping thickness, in particular greater than the minimum clamping thickness. This makes it possible to achieve a situation in which not only are no unnecessary radial forces exerted on the inside of the bores of the workpieces in the region of the folding portion, but also no or only slight forces are exerted on the workpieces in the radial direction over the entire axial length of the bores of the workpieces.

The radial expansion of the rigid portion is in this case preferably less than 10%, based on the outside diameter.

The head forming portion can in general be designed in any desired manner. However, it is preferable if the head forming portion is also designed such that the blind head formed during the setting of the blind rivet is a folded blind head. As a result, it is possible to achieve blind heads having a relatively large diameter such that the mechanical loading can also be minimized on the bearing face of the blind head against the joint material in the axial direction.

It is of particular preference if the head forming portion has a first forming portion and an axially adjacent setting forming portion, wherein the strength of the second forming portion is greater than the strength of the first forming portion.

As a result, it is possible to achieve a controlled folding of the blind head.

Of particular preference here is if the first forming portion is arranged in the axial direction adjacent to a blind-side end of the sleeve shank.

Of particular preference furthermore is if the head forming portion has a third forming portion which is arranged on a side of the second forming portion opposite to the first forming portion and has a lower strength than the second forming portion.

This measure, too, can also favour the formation of a folded blind head.

The head forming portion here is preferably designed such that it is formed without support on the blind-side workpiece surface during the setting and is furthermore preferably designed such that it is pulled up onto the workpiece arrangement after complete formation. Consequently, the blind head or closing head design, in particular the size measured in diameter, can be constantly achieved independently of the clamping thickness of the workpiece arrangement, that is to say be identical over the preferably entire clamping range. Consequently, constant head tensile strengths can be achieved independently of the thickness of the workpieces.

As a result of the pulling-on, the workpieces are brought towards one another such that the axial gaps are ideally reduced to zero. By suitably choosing the strength of the folding portion, it is also possible here to contribute to the fact that the forces on the workpiece arrangement in the axial direction do not become too large.

The sleeve shank preferably has a ratio of outside diameter to inside diameter (measured in a region of the sleeve shank without radially incorporated impressions, embossings, rolled formations, etc., which are incorporated to control the formation of the blind head and/or the sleeve fold) in the range from 1.1 to 1.6, in particular in the range from 1.2 to 1.5, and particularly preferably in the range from 1.24 to 1.36.

Overall, a so-called sleeve-folding blind rivet with reduced surface and edge loading on the workpiece arrangement is provided and with a closing head which is preferably constant over the clamping range, to be precise likewise preferably avoiding an increasing hole face bearing pressure with low clamping thicknesses.

It will be understood that the features mentioned above and the features still to be explained below cannot only be used in the respectively indicated combination but also in other combinations or in isolation without departing from the scope of the present invention.

BRIEF DESCRIPTION OF THE DRAWINGS

Exemplary embodiments of the invention are illustrated in the drawing and are explained in greater detail in the description which follows. In the drawing:

FIG. 1 shows a perspective view of an embodiment of a blind rivet sleeve according to the invention;

FIG. 2 shows a longitudinal sectional view of the blind rivet sleeve of FIG. 1;

DETAILED DESCRIPTION OF THE INVENTION

Figure 3:
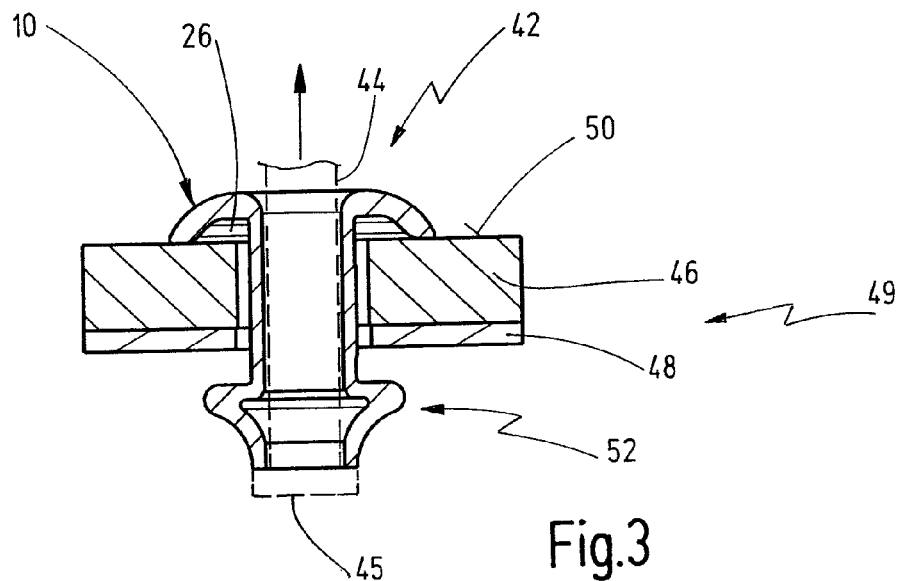
FIG. 3 shows a blind rivet which is inserted into a bore of a workpiece arrangement, where the blind head has already formed owing to the pulling force of the mandrel.

A first embodiment of a blind rivet sleeve according to the invention is shown in FIGS. 1 and 2 and designated generally by 10.

The blind rivet sleeve 10 has a sleeve head 12 and a sleeve shank 14 adjoining the sleeve head 12. The blind rivet sleeve 10 has a through-opening 16 which passes through the sleeve shank 14 and the sleeve head 12 and which is oriented axially. The sleeve shank 14 has a blind-side end 18 facing away from the sleeve head 12 and also a head-side end 20 facing the sleeve head 12.

The sleeve head 12 has a bearing face 24 pointing in the direction of the sleeve shank 14 and intended to bear against a visible workpiece. In the present case, an axial recess 26 is formed on the sleeve head 12 in the region of the bearing face 24 in such a way that the sleeve head 12 extends from the head-side end 20 of the sleeve shank 14 in the manner of a mushroom head.

The sleeve shank 14 has a head forming portion 30 adjacent to the blind-side end 18. Furthermore, the sleeve shank 14 has a rigid portion 32 adjoining the head forming portion 30. A folding portion 34 is further formed on the sleeve shank 14 between the rigid portion 32 and the sleeve head 12.

The portion of the sleeve shank 14 which forms the blind-side end 18 has an axial length $L_1$. The head forming portion 30 has an axial length $L_2$. The rigid portion 32 has an axial length $L_3$, and the folding portion 34 has an axial length $L_4$.

The length $L_2$ is preferably greater than the length $L_3$, and the length $L_3$ is preferably greater than the length $L_4$.

The sleeve head 12 has an axial length $L_5$, and the axial recess 26 has an axial depth $L_6$.

The axial depth $L_6$ of the axial recess 26 is preferably greater than or equal to 0.3 times the axial length $L_5$ of the sleeve head 12, and preferably greater than or equal to 0.4 times the axial length $L_5$ of the sleeve head 12.

The axial length $L_4$ of the folding portion is preferably greater than the axial depth $L_6$ of the axial recess, but preferably less than 2.5 times the axial depth $L_6$ of the axial recess 26.

The sleeve shank 14 has an outside diameter $D_1$ and an inside diameter $D_2$.

The sleeve head 12 has an outside diameter $D_3$, and the axial recess 26 has a maximum outside diameter $D_4$ (in the region of the transition to the annular bearing face 24).

The outside diameter $D_4$ of the axial recess 26 is preferably less than or equal to 0.9 times the outside diameter $D_3$, in particular less than or equal to 0.8 times the outside diameter $D_3$ of the sleeve head 12.

The inside diameter of the axial recess 26 is preferably defined by the outside diameter $D_1$ of the sleeve shank 14.

The ratio of outside diameter $D_1$ to inside diameter $D_2$ of the sleeve shank 14 lies preferably in the range from 1.1 to 1.6, in particular in the range from 1.2 to 1.5, and particularly preferably in the range from 1.24 to 1.36, measured in the region of the sleeve shank 14 without radially incorporated impressions, embossings, rolled formations, etc., which serve to control the deformation of the sleeve shank 14.

The head forming portion 30 has a first forming portion 36, a second forming portion 38 and a third forming portion 40. The first forming portion 36 is adjacent to the blind-side end 18 and has a length $L_7$. The second forming portion 38 is adjacent to the first forming portion 36 and has an axial length $L_8$. The third forming portion 40 is arranged between the second forming portion 38 and the rigid portion 32 and has an axial length $L_9$.

The axial lengths $L_7$, $L_8$, $L_9$ can be approximately identical.

The second (central) forming portion 38 has a higher strength than the first forming portion 36 and the third forming portion 40. The rigid portion 32 has a higher strength than all of the forming portions 36, 38, 40. On its outer circumference, the rigid portion 32 can have embossings 41, in particular longitudinal embossings, which have been formed on the rigid portion 32 by cold forming. The head forming portion 30 is, by contrast, preferably not cold-formed at least in the region of the second forming portion 38. Furthermore, the folding portion 34 is likewise preferably not cold-formed.

The folding portion 34 preferably has the lowest strength of the portions 30, 32, 34.

Figure 4:
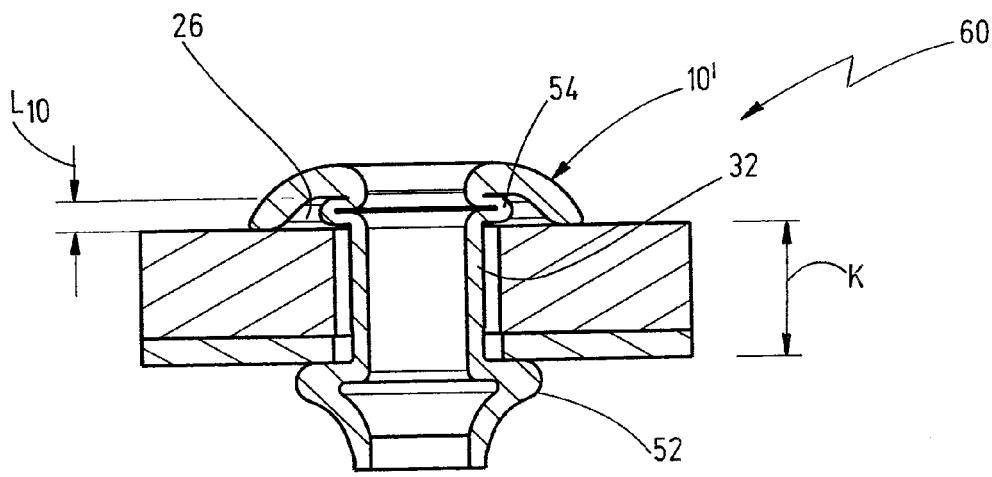
FIG. 4 shows a longitudinal sectional view through a blind rivet connection produced by means of the blind rivet according to the invention.

FIGS. 3 and 4 show a state during the setting of a blind rivet connection and a state after the setting of a blind rivet connection using the above-described blind rivet sleeve 10. In conjunction with a mandrel 44, the blind rivet sleeve 10 forms a blind rivet 42. The mandrel 44 has a mandrel head 45 in a manner known in principle per se, which mandrel head acts on the sleeve shank 14 in the region of the blind-side end 18. The setting takes place after the non-deformed blind rivet has been inserted with the blind-side end leading into a bore of a workpiece arrangement 49 which preferably comprises at least two workpieces 46, 48. The workpieces 46, 48 can both be produced from metal, can both be produced from plastic, or can be formed by a plastic part and a metal part, or the like.

After introducing the blind rivet 42 into the bore, the bearing face 24 of the sleeve head 12 rests on a visible surface 50 of the visible workpiece 46. A pull-off force is then exerted on the mandrel 44, specifically in the direction away from the workpiece arrangement, with the sleeve head 12 in general being fixed axially by a device (for example blind-riveting tongs or the like) not shown in further detail.

As a result of this pull-off force, the head forming portion 30 at first deforms, specifically in such a way that an outwardly directed fold is formed between the third forming portion 40 and the first forming portion 36. The head forming portion 30 is deformed here without bearing against the blind-side surface of the blind-side workpiece 38. The blind head 52 thus formed is depicted in FIG. 3. By exerting a further, and if appropriate, increasing pull-off force on the mandrel 44, the blind head 52 continues to be drawn in the direction of the blind-side surface of the workpiece arrangement until the blind head 52 finally bears thereon, as is shown in FIG. 4.

Depending on the clamping thickness K of the workpiece arrangement 49, a deformation of the folding portion 34 also takes place here. FIG. 4 in this case shows a minimum clamping thickness K or a clamping thickness in the region of the minimum clamping thickness K such that the folding portion 34 is deformed to a maximum. Here, the folding portion 34 has deformed into an outwardly directed sleeve fold 54 which has been drawn into the axial recess 26, specifically to the extent of at least 80% and, in the example shown, to the extent of 100%.

The blind rivet sleeve formed to this extent is designated by 10' in FIG. 4. The finished blind rivet connection is designated by 60 in FIG. 4.

For larger clamping thicknesses K it may be the case that the folding portion 34 is deformed less than shown in FIG. 4 or not at all.

FIG. 4 further shows that the rigid portion 32 extends over an axial length which is substantially equal to the minimum clamping thickness K. It is thereby possible to ensure that in the ideal case no forces at all are exerted on the workpiece arrangement in the radial direction, and only relatively large-area forces are exerted in the axial direction on the workpiece arrangement by means of the sleeve head 12 and the blind head 52, making it possible to fall below the admissible loadings even when using plastics or the like.

The rigid portion 32 has deformed not at all or substantially not at all during the setting process. At any rate, the radial expansion lies in the region of less than 10%, (preferably less than 5%) based on the diameter of the rigid portion 32.

Figure 5:
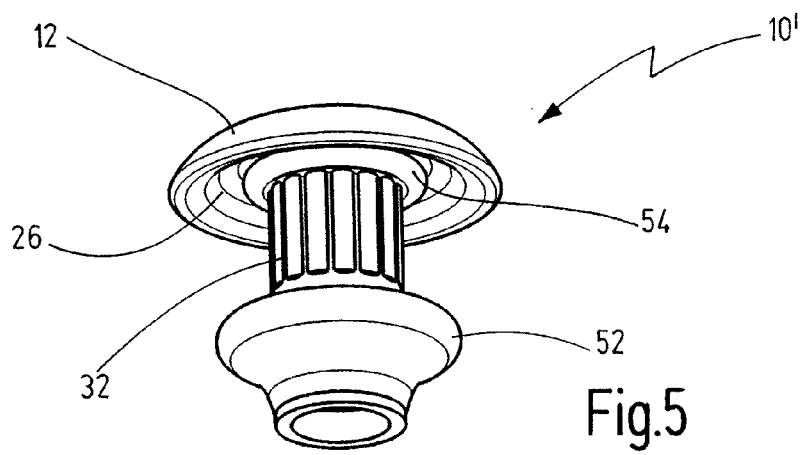
FIG. 5 shows a perspective view of the deformed blind rivet of FIG. 4 without workpieces.

FIG. 5 shows that the sleeve fold 54 is situated completely or virtually completely within the axial recess 26. FIG. 5 further shows that the rigid portion 32 has remained substantially non-deformed (in relation to FIG. 1). FIG. 5 further shows the fold-like deformation of the head forming portion 30 into a folded blind head 52

The invention claimed is:

1. A blind rivet sleeve for a blind rivet, the sleeve having a sleeve head which has a bearing face for bearing against a visible workpiece surface, and having a sleeve shank, wherein the blind rivet sleeve has a through-opening through which a mandrel can be guided, wherein the sleeve shank has a head forming portion which, during the setting of the blind rivet, is designed to form a blind head, and has a folding portion which is arranged between the head forming portion and the sleeve head and which, during the setting of the blind rivet, is designed to form a sleeve fold for the purpose of achieving a clamping thickness compensation, wherein the sleeve head has in the region of the bearing face an axial recess for receiving at least part of the sleeve fold formed during the setting.

2. The blind rivet sleeve of claim 1, wherein an axial depth ($L_6$) of the axial recess and an axial length ($L_4$) of the folding portion are selected such that the sleeve fold makes no contact or substantially force-free contact with a workpiece arrangement connected by means of the blind rivet.

3. The blind rivet sleeve of claim 1, wherein an axial depth ($L_6$) of the axial recess is greater than or equal to 0.3 times the axial length ($L_5$) of the sleeve head.

4. The blind rivet sleeve of claim 1, wherein an outside diameter ($D_4$) of the axial recess is greater than or equal to 0.4 times the outside diameter ($D_3$) of the sleeve head.

5. The blind rivet sleeve of claim 1, wherein a rigid portion is arranged in the axial direction between the folding portion and the head forming portion.

6. The blind rivet sleeve of claim 1, wherein the head forming portion has a first forming portion and an axially adjacent second forming portion, wherein the strength of the second forming portion is greater than the strength of the first forming portion.

7. The blind rivet sleeve of claim 6, wherein the first forming portion is arranged in the axial direction adjacent to a blind-side end of the sleeve shank.

8. The blind rivet sleeve of claim 6, wherein the head forming portion has a third forming portion which is arranged on a side of the second forming portion opposite to the first forming portion and has a lower strength than the second forming portion.

9. The blind rivet sleeve of claim 1, wherein that the ratio of an outside diameter ($D_1$) to an inside diameter ($D_2$) of the sleeve shank lies in the range from 1.1 to 1.6, in particular in the range from 1.2 to 1.5.

10. A blind rivet having a mandrel and the blind rivet sleeve of claim 1, wherein the mandrel has a blind-side mandrel head for bearing in the region of a blind-side end of the sleeve shank.

11. A blind rivet connection of at least two workpieces using the blind rivet of claim 10.

12. The blind rivet sleeve of claim 1, wherein an axial depth ($L_6$) of the axial recess is greater than or equal to 0.4 times the axial length ($L_5$) of the sleeve head.

13. The blind rivet sleeve of claim 1, wherein an outside diameter ($D_4$) of the axial recess is greater than or equal to 0.5 times the outside diameter ($D_3$) of the sleeve head.

14. The blind rivet sleeve of claim 1, wherein that the ratio of an outside diameter ($D_1$) to an inside diameter ($D_2$) of the sleeve shank lies in the range from 1.1 to 1.6, in particular in the range from 1.24 to 1.36.

\* \* \* \* \*